United States Patent
Srinivasan et al.

(10) Patent No.: US 8,036,274 B2
(45) Date of Patent: Oct. 11, 2011

(54) SIMD LAPPED TRANSFORM-BASED DIGITAL MEDIA ENCODING/DECODING

(75) Inventors: Sridhar Srinivasan, Redmond, WA (US); Chengjie Tu, Sammamish, WA (US); Parker Shaw, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1507 days.

(21) Appl. No.: 11/203,644

(22) Filed: Aug. 12, 2005

(65) Prior Publication Data

US 2007/0036225 A1 Feb. 15, 2007

(51) Int. Cl.
  H04N 7/12 (2006.01)
  H04N 11/02 (2006.01)
  H04N 11/04 (2006.01)
(52) U.S. Cl. .................... 375/240.18; 708/401
(58) Field of Classification Search ............. 375/240.18; 708/401; 382/232
See application file for complete search history.

(56) References Cited

U.S. PATENT DOCUMENTS

| | | |
|---|---|---|
| 4,754,492 A | 6/1988 | Malvar |
| 5,297,236 A | 3/1994 | Antill et al. |
| 5,311,310 A | 5/1994 | Jozawa et al. |
| 5,384,849 A | 1/1995 | Jeong |
| 5,805,739 A | 9/1998 | Malvar et al. |
| 5,822,000 A | 10/1998 | Yoon |
| 5,850,294 A | 12/1998 | Apostolopoulos et al. |
| 5,859,788 A | 1/1999 | Hou |
| 5,933,522 A | 8/1999 | Sugimoto |
| 5,933,541 A | 8/1999 | Kutka et al. |
| 5,970,173 A | 10/1999 | Lee et al. |
| 5,973,755 A | 10/1999 | Gabriel |
| 5,982,459 A | 11/1999 | Fandrianto et al. |
| 6,011,625 A | 1/2000 | Glass |
| 6,029,126 A | 2/2000 | Malvar |
| 6,064,776 A | 5/2000 | Kikuchi et al. |
| 6,073,153 A | 6/2000 | Malvar |

(Continued)

FOREIGN PATENT DOCUMENTS

AU 7351001 1/2002

(Continued)

OTHER PUBLICATIONS

Ostermann, J, Bormans, J., List, P., Marpe, D., Narroschke, M., Pereira, F., Stockhammer,T., Wedl, T., "Video Coding with H.264/AVC: Tools, Performance, and Complexity", IEEE Circuits and Systems Magazine, First Quarter 2004.*

(Continued)

*Primary Examiner* — Young Lee
*Assistant Examiner* — James Pontius
(74) *Attorney, Agent, or Firm* — Klarquist Sparkman, LLP

(57) ABSTRACT

A block transform-based digital media codec achieves faster performance by re-mapping components of the digital media data into vectors or parallel units on which many operations of the transforms can be performed on a parallel or single-instruction, multiple data (SIMD) basis. In the case of a one-dimensional lapped biorthogonal transform, the digital media data components are re-mapped into vectors on which butterfly stages of both overlap pre-/post-filter and block transform portions of the lapped transform can be performed on a SIMD basis. In the case of a two-dimensional lapped biorthogonal transform, the digital media data components are re-mapped into vectors on which a Hadamard operator of both overlap pre-/post-filter and block transform can be performed on a SIMD basis.

24 Claims, 14 Drawing Sheets

U.S. PATENT DOCUMENTS

| | | | |
|---|---|---|---|
| 6,101,279 | A | 8/2000 | Nguyen et al. |
| 6,115,689 | A | 9/2000 | Malvar |
| 6,154,762 | A | 11/2000 | Malvar |
| 6,219,458 | B1 | 4/2001 | Zandi et al. |
| 6,249,610 | B1 | 6/2001 | Matsumoto et al. |
| 6,253,165 | B1 | 6/2001 | Malvar |
| 6,307,887 | B1 | 10/2001 | Gabriel |
| 6,324,560 | B1 | 11/2001 | Malvar |
| 6,370,502 | B1 | 4/2002 | Wu et al. |
| 6,393,061 | B1 | 5/2002 | Owechko |
| 6,393,156 | B1 | 5/2002 | Nguyen et al. |
| 6,421,464 | B1 * | 7/2002 | Tran et al. ............ 382/232 |
| 6,487,574 | B1 | 11/2002 | Malvar |
| 6,496,795 | B1 | 12/2002 | Malvar |
| 6,728,315 | B2 | 4/2004 | Haskell et al. |
| 6,728,316 | B2 | 4/2004 | Enficiaud et al. |
| 6,763,068 | B2 | 7/2004 | Oktem |
| 6,771,828 | B1 | 8/2004 | Malvar |
| 6,771,829 | B1 | 8/2004 | Topiwala et al. |
| 6,832,232 | B1 * | 12/2004 | Hus et al. ............ 708/401 |
| 6,865,229 | B1 | 3/2005 | Pronkine |
| 7,006,699 | B2 | 2/2006 | Malvar |
| 7,027,654 | B1 | 4/2006 | Ameres et al. |
| 7,050,504 | B2 | 5/2006 | Joch et al. |
| 7,106,797 | B2 | 9/2006 | Malvar |
| 7,110,610 | B2 | 9/2006 | Malvar |
| 7,116,834 | B2 | 10/2006 | Malvar |
| 7,120,297 | B2 | 10/2006 | Simard |
| 7,155,065 | B1 | 12/2006 | Malvar |
| 7,167,522 | B2 | 1/2007 | Webb |
| 7,181,403 | B2 | 2/2007 | Wu et al. |
| 7,275,036 | B2 | 9/2007 | Geiger et al. |
| 7,305,139 | B2 | 12/2007 | Srinivasan et al. |
| 7,315,822 | B2 | 1/2008 | Li |
| 7,412,102 | B2 | 8/2008 | Srinivasan et al. |
| 7,428,342 | B2 | 9/2008 | Tu et al. |
| 7,460,993 | B2 | 12/2008 | Chen et al. |
| 7,471,726 | B2 | 12/2008 | Srinivasan |
| 7,471,850 | B2 | 12/2008 | Srinivasan |
| 7,551,789 | B2 | 6/2009 | Tu et al. |
| 2002/0110280 | A1 * | 8/2002 | Prakash et al. ........... 382/240 |
| 2002/0118748 | A1 | 8/2002 | Inomata et al. |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0185439 | A1 * | 10/2003 | Malvar ............ 382/166 |
| 2003/0187634 | A1 | 10/2003 | Li |
| 2003/0206582 | A1 | 11/2003 | Srinivasan |
| 2004/0167757 | A1 | 8/2004 | Strujs |
| 2004/0170302 | A1 | 9/2004 | Museth et al. |
| 2005/0013359 | A1 | 1/2005 | Srinivasan |
| 2005/0083216 | A1 | 4/2005 | Lin |
| 2005/0231396 | A1 | 10/2005 | Dunn |
| 2006/0114993 | A1 | 6/2006 | Xiong et al. |
| 2006/0133682 | A1 | 6/2006 | Tu et al. |
| 2006/0133684 | A1 | 6/2006 | Srinivasan et al. |
| 2006/0291734 | A1 | 12/2006 | Hou |
| 2006/0291735 | A1 | 12/2006 | Hou |
| 2006/0291736 | A1 | 12/2006 | Hou |
| 2006/0293881 | A1 | 12/2006 | Hou |
| 2008/0075377 | A1 | 3/2008 | Topiwala et al. |
| 2009/0299754 | A1 | 12/2009 | Mehrotra |

FOREIGN PATENT DOCUMENTS

| | | |
|---|---|---|
| EP | 0467054 B1 | 1/1992 |
| EP | 1202219 | 5/2002 |
| JP | 05-083141 | 4/1993 |
| JP | 5-091459 | 4/1993 |
| JP | 6-290262 | 10/1994 |
| JP | 11-088701 | 3/1999 |
| JP | 11-203271 | 7/1999 |
| JP | 2002-182693 | 6/2002 |
| JP | 2002-304624 | 10/2002 |
| JP | 2003-283840 | 10/2003 |
| JP | 2003-298846 | 10/2003 |
| JP | 2003-324757 | 11/2003 |
| JP | 2004-201047 | 7/2004 |
| KR | 10-2004-0050888 | 6/2004 |
| KR | 10-2006-0083125 | 7/2006 |
| KR | 10-2006-0092826 | 8/2006 |
| RU | 2194361 | 12/2002 |
| WO | WO 02/07438 | 1/2002 |
| WO | WO 03/038752 | 5/2003 |
| WO | WO 03/053066 | 6/2003 |
| WO | WO 2007/021615 A3 | 2/2007 |

OTHER PUBLICATIONS

Tran, T., Liang, J. and Tu, C, "Lapped Transform via Time-Domain Pre- and Post-Filtering", IEEE Transactions on Signal Processing, vol. 51, No. 6, Jun. 2003.*

U.S. Appl. No. 60/341,674, filed Dec. 2001, Lee et al.

U.S. Appl. No. 60/488,710, filed Jul. 2003, Srinivasan et al.

Adams, "Generalized Reversible Integer-to-Integer Transform Framework," 2003 IEEE Pacific Rim Conference on Communications, Computers, and Signal Processing, vol. 2, Aug. 2003, pp. 1000-1003.

Ahmed et al., "Discrete Cosine Transform," *IEEE Transactions on Computers*, C-23 (Jan. 1974), pp. 90-93.

Apostolopoulos et al., "Post-processing for very low bit-rate video compression," *IEEE Trans. Image Processing*, vol. 8, pp. 1125-1129 (Aug. 1999).

Bhaskaran et al., "Image and Video Compression Standards Algorithms and Architectures," 2nd ed., 1997, pp. 192-194.

de Queiroz et al., "Lapped transforms for image compression," *The Handbook on Transforms and Data Compression*, CRC Press, pp. 197-265 (Oct. 2000).

de Queiroz et al., "Time-Varying Lapped Transforms and Wavelet Packets," *IEEE Transactions on Signal Processing*, vol. 41, No. 12, pp. 3293-3305 (1993).

Goel et al., "Pre-processing for MPEG Compression Using Adaptive Spatial Filtering," *Proceedings of 1995 IEEE International Conference on Consumer Electronics*, 1995, pp. 246-247.

"H.264 & IPTV Over DSL—Enabling New Telco Revenue Opportunities," White Paper, Intel/Envivio, available at http://www.envivio.com/images/products/H264whitepaper.pdf (May 15, 2004), 12 pp.

Hao et al., "Matrix Factorizations for Reversible Integer Mapping," IEEE Transactions on Signal Processing, vol. 49, Issue 10, Oct. 2001, pp. 2314-2324.

International Search Report for PCT/US04/28969, completed Jul. 11, 2006, 4 pp.

ISO/IEC, "ISO/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC JTC1/SC29/WG11 N4668, "Coding of Moving Pictures and Audio," Title: MPEG-4 Overview—(V.21—Jeju Version), Editor: Rob Koenen (rob.koenen@m4if.org), available at http://www.chiariglione.org/mpeg/standards/mpeg-4/mpeg-4.htm (Mar. 2002), 66 pp.

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Codingk for Low Bit Rate Communication," 167 pp. (1998).

Jain, "Fundamentals of Digital Image Processing," Chapters 2, 5, and 11, Prentice Hall, 189 pp. (1989).

Joint Video Team (JVT) of ISO/IEC MPEG & ITU-T VCEG, "Joint Final Committee Draft (JFCD) of Joint Video Specification," JVT-D157, 207 pp. (Aug. 2002).

Klausutis et al., "Variable Block Size Adaptive Lapped Transform-based Image Coding," *1997 International Conference on Image Processing (ICIP '97)*, vol. 3, pp. 686-689 (1997).

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Malvar, "Lapped Transforms for Efficient Transform/Subband Coding," *IEEE Transactions on Acoustics, Speech and Signal Processing*, vol. 38, No. 6, pp. 969-978 (1990).

Malvar, "Signal Processing With Lapped Transforms," Norwood, MA: Artech House, pp. 175-219, 264-273, and 353-357 (1992).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Paeth, "A Fast Algorithm for General Raster Rotation," *Proceedings of Graphics Interface '86*, pp. 77-81, May 1986.

Park et al., "A post processing method for reducing quantization effects in low bit-rate moving picture coding," *IEEE Trans. Circuits Syst.*, Video Technol., vol. 9, pp. 161-171 (Feb. 1999).

Printouts of FTP directories from http://ftp3.itu.ch, 8 pp. (downloaded from the World Wide Web on Sep. 20, 2005).

Proposed SMPTE Standard for Television: VC-1 Compressed Video Bitstream Format and Decoding Process, pp. 1-500, (Aug. 2005).

Rao et al., "Techniques and Standards for Image, Video, and Audio Coding," Englewood Cliffs, NJ: Prentice-Hall (1996).

Reader, "History of MPEG Video Compression—Ver. 4.0," 99 pp. (document marked Dec. 16, 2003), 21 pp.

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Tanaka et al., "A Rotation Method for Raster Image Using Skew Transformation," *Proc IEEE Conf on Computer Vision and Pattern Recognition*, pp. 272-277, Jun. 1986.

Tran et al., "Lapped Transform Based Video Coding," *Proc. SPIE Applicat. Digital Image Processing XXIV*, San Diego, CA, pp. 319-333 (Aug. 2001).

Tran, "Lapped Transform via Time-Domain Pre- and Post-Processing," *2001 Conference on Information Sciences and Systems*, The Johns Hopkins University (Mar. 21-23, 2001).

Tu et al., "Context-Based Entropy Coding of Block Transform Coefficients for Image Processing," *IEEE Transactions on Image Processing*, vol. 11, No. 11, pp. 1271-1283 (Nov. 2002).

Wien, "Variable Block-Size Transforms for Hybrid Video Coding," Dissertation, 182 pp. (Feb. 2004).

International Search Report and Written Opinion for PCT/US06/30565.

Ostermann et al., "Video Coding with H.264/AVC", *IEEE Circuits and Systems Magazine*, First Quarter 2004 (retrieved on Apr. 14, 2007), retrieved from the internet <URL:http://ieeexplore.ieee.org>.

Tran et al., Lapped Transform via Time-Domain Pre- and Post-Filtering, *IEEE Transactions on Signal Processing*, vol. 51, No. 6, Jun. 2003 (retrieved on Apr. 15, 2007), retrieved from the internet <URL:http://ieeexplore.ieee.org> 2, 7, 11, 15.

International Search Report for PCT/US2009/044983 dated Jan. 7, 2010, 10 pp.

Malvar, "Extended Lapped Transforms: Fast Algorithms and Applications," ICASSP, vol. 3, pp. 1797-1800, Apr. 14-17, 1991.

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

ISO/IEC 14496-2, "Coding of Audio-Visual Object—Part 2: Visual," Third Edition, pp. 1-727, (Jun. 2004).

Malvar, "Signal Processing with Lapped Transforms," pp. 143-173, and 265-273 (1992).

Malvar, "Fast Progressive Image Coding without Wavelets", IEEE Data Compression Conference, Snowbird, Utah, 10 pp. (Mar. 2000).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

Tran et al., "Lapped Transform via Time-Domain Pre- and Post-Filtering," IEEE Transactions on Signal Processing, vol. 51, No. 6, pp. 1557-1571 (Jun. 2003).

Arai et al., "A Fast DCT-SQ Scheme for Images," *The Trans. of the IEICE*, vol. E 71, No. 11, pp. 1095-1097 (Nov. 1988).

Cham, "Development of integer cosine transforms by the principle of dyadic symmetry," *IEE Proc.*, vol. 136, Pt. 1, No. 4, pp. 276-282 (Aug. 1989).

Chen et al., "A Fast Computational Algorithm for the Discrete Cosine Transform," *IEEE Trans. on Communications*, vol. COM-25, No. 9, pp. 1004-1009 (Sep. 1977).

Cheng et al., "New family of lapped biorthogonal transform via lifting steps," *IEE Proc. Vision, Image and Signal Processing*, vol. 149, No. 2, pp. 91-96 (Apr. 2002).

Examination Report dated Sep. 24, 2009, from New Zealand Patent Application No. 565534, 2 pp.

Examiner's First Report dated Oct. 22, 2010, from Australian Patent Application No. 2006280180, 2 pp.

First Office Action dated Nov. 20, 2009, from Chinese Patent Application No. 200680029306.3, 8 pp.

Hohl, "An 8×8 Discrete Cosine Transform Implementation on the TMS320C25 or the TMS320C30," *Texas Instruments Application Report SPRA115*, pp. 1-25 (1990) http://focus.ti.com/lit/an/spra115/spra115.pdf [Downloaded from the World Wide Web on Dec. 28, 2005].

Hui et al., "An Integer Hierarchy Lapped Biorthogonal Transform via Lifting Steps and Application in Image Coding," *IEEE Int'l Conf. on Signal Processing*, vol. 1, pp. 664-667 (Aug. 2002).

Intel Corporation, "Using Streaming SIMD Extensions in a Fast DCT Algorithm for MPEG Encoding," Version 1.2, 11 pp. (Jan. 1999).

Intel Corporation, "Using MMX™ Instructions in a Fast iDCT Algorithm for MPEG Decoding," 21 pp. (Mar. 1996).

List et al., "Adaptive deblocking filter," *IEEE Trans. on Circuits and Systems for Video Technology*, vol. 13, No. 7, pp. 614-619 (Jul. 2003).

Muramatsu et al., "The two-dimensional lapped Hadamard transform," *IEEE Proc. on Circuits and Systems*, vol. 5, pp. 86-89 (May 1998).

Murata et al., "Fast 2D IDCT Implementation with Multimedia Instructions for a Software MPEG2 Decoder," *IEEE Conf. Acoustics, Speech and Signal Processing*, vol. 5, 4 pp. (May 1998).

Notice on Grant of Patent dated Aug. 31, 2010, from Chinese Patent Application No. 200680029306.3, 4 pp.

Notice on the Second Office Action dated May 25, 2010, from Chinese Patent Application No. 200680029306.3, 8 pp.

Substantive Examination Adverse Report dated Jun. 19, 2009, from Malaysian Patent Application No. PI20063565, 4 pp.

Tran et al., "Regularity-constrained pre- and post-filtering for block DCT-based systems,", *IEEE Trans. on Signal Processing*, vol. 51, No. 10, pp. 2568-2581 (Oct. 2003).

Decision on Grant dated Mar. 3, 2011, from Russian Patent Application No. 2008105020 (with English translation), 22 pp.

Examination Report dated Feb. 21, 2011, from New Zealand Patent Application No. 565534, 2 pp.

Examiner's Report No. 2 dated Mar. 7, 2011, from Australian Patent Application No. 2006280180, 1 pp.

Fukuma et al., "Lossless 8-point fast discrete cosine transform using lossless hadamard transform," *Technical Report of IEICE*, vol. 99, No. 399, pp. 37-44 (Oct. 29, 1999) (with English abstract).

Gangaputra et al., "Adaptive Pre- and Post-Filtering for Block Based Systems," *IEEE Int'l Conf. on Acoustics, Speech, and Signal Processing*, vol. 4, pp. IV-3297 through IV-3300 (May 2002).

Malvar, "Lapped Biorthogonal Transforms for Transform Coding with Reduced Blocking and Ringing Artifacts," *IEEE Int'l Conf. on Acoustics, Speech, and Signal Processing*, vol. 3, pp. 2421-2424 (Apr. 1997).

Notice of Rejection dated Dec. 7, 2010, from Japanese Patent Application No. 2008-526093 (with English translation), 9 pp.

Office action dated Aug. 9, 2010, from Mexican Patent Application No. MX/a/2008/001853, 2 pp.

Office action dated Nov. 24, 2010, from Russian Patent Application No. 2008105020, 4 pp.

Srinivasan et al., "Windows Media Video 9: overview and applications," *Signal Processing Image Communication*, vol. 19, No. 9, pp. 851-875 (Oct. 2004).

Wang et al., "Interlace Coding Tools for H.26L Video Coding," ITU, VCEG-O37, 20 pp. (Nov. 2001).

\* cited by examiner

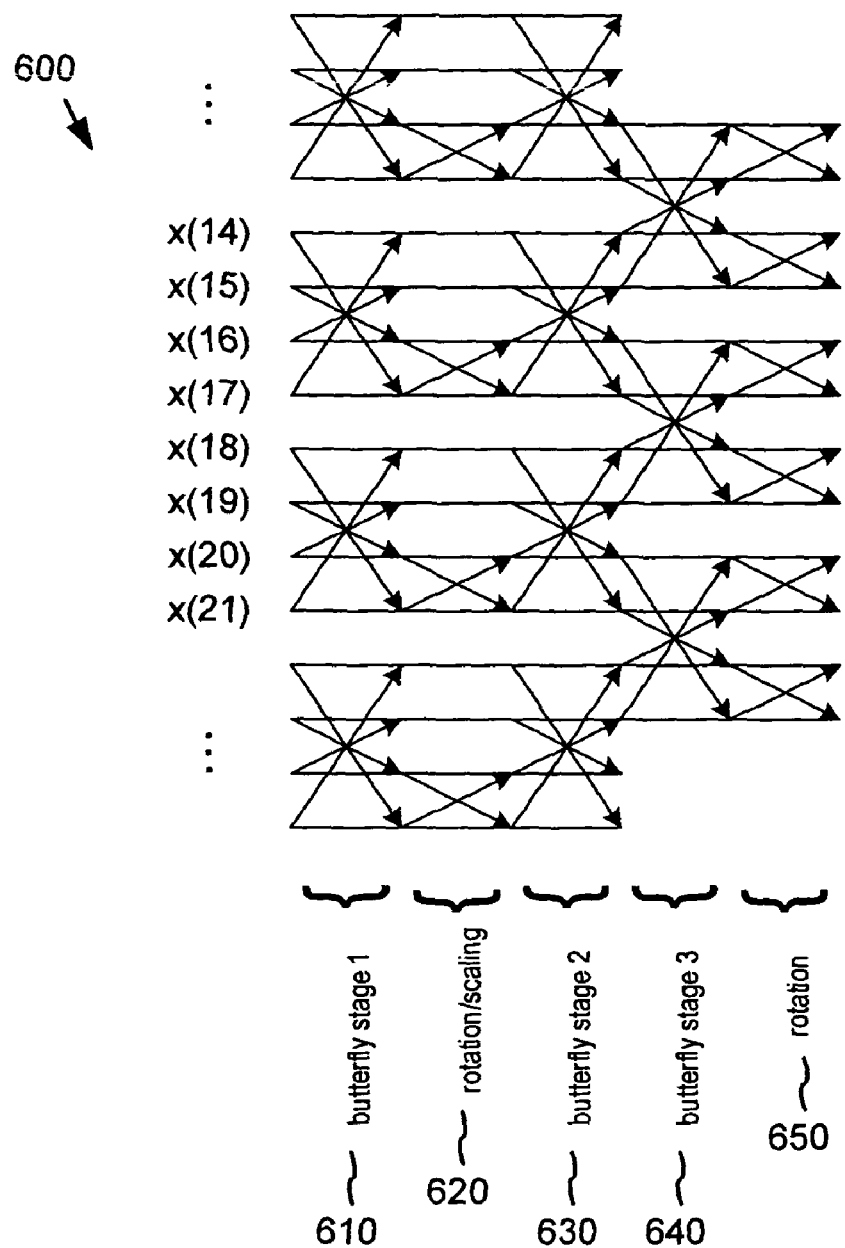

800

| v7 |   | x(15) | x(14) |
|----|---|-------|-------|
| v8 | = | x(16) | x(17) |
| v9 |   | x(19) | x(18) |
| v10|   | x(20) | x(21) |

900

Four 4x4 blocks with pixels labeled

Twisted and vectorized blocks – 16 vectors of 4 components represent the area

Vector notation of pixels

Figure 12

Software 1780 Implementing Digital Media Codec using SIMD Lapped Biorthogonal Transform

US 8,036,274 B2

SIMD LAPPED TRANSFORM-BASED DIGITAL MEDIA ENCODING/DECODING

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$) The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

Lapped Transforms

In the above described block transform-based coding systems, a block transform is a finite length (typically a short length such as 4 or 8) transform that is applied in succession to non-overlapping adjacent blocks of the input signal or image. Thus, signal components straddling block boundaries do not influence the transform of the block across the boundary. Due to quantization of the high frequency components for compression of data, use of block transforms can introduce perceptible artifacts at block boundaries, or blockiness. Blockiness is apparent in highly compressed JPEG images and shows up as square blocks or staircase shapes in the image. In audio, blockiness leads to periodic popping noise. Neither of these is a tolerable artifact.

The lapped transform (LT 210 illustrated in FIG. 2) is an alternative means of representing a signal or image that does not suffer from sharp blockiness. In a lapped transform, the input signal components influencing each transform coefficient set are larger than the size of the transform output block. For instance in a 1D case, 8 successive signal components may influence the 4 point transform. Likewise for images, an 8×8 area may influence a 4×4 transform block.

Lapped transforms may be formulated in one of two ways. One classical formulation of a lapped transform is a series of block transforms followed by a series of frequency mixers. The block transforms are aligned to the regular grid of N points (N being the transform size), whereas the frequency mixers are spaced symmetrically across the block boundaries. An alternative formulation has a pre filtering operation performed across block edges followed by a block transform.

Inverses of lapped transforms (e.g., ILT 220 of FIG. 2) generally are straightforward to compute and implement. The signal flow graph is reversed, with each elementary operation being inverted. One classical formulation of an inverse lapped transform is a series of frequency mixers followed by a series of block transforms. An alternative formulation comprises a series of block transforms followed by post-filtering operations applied across block boundaries.

In either formulation of lapped transforms, the key components are (i) block transforms and (ii) operators straddling blocks, which may be frequency mixers, pre- or post-filters. These operators (ii) are referred to collectively as overlap filters.

Lapped orthogonal transforms (LOTs) are a subclass of lapped transforms. These have the property that the forward and inverse transforms are transposes. From the compression standpoint, the subclass lapped biorthogonal transforms are more interesting since they can achieve better PSNR than LOTs. Biorthogonality refers to the analysis and synthesis basis functions being biorthogonal (i.e. mutually orthogonal).

SUMMARY

A digital media coding and decoding technique and realization of the technique in a digital media codec described herein achieves speed-up of the transform used for encoding and decoding. This technique reformulates a lapped (or other) transform as a set of operations that are largely single instruction, multiple data (SIMD) friendly. This is achieved by remapping the input and output sampling grids of the lapped transform. By this remapping, the input data can be grouped into "vectors" or parallel units. With this rearrangement, many of the lapped transform steps can be executed as vector operations. The few remaining operations that are not vectorizable are performed on the vector components in a sequential manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a signal flow graph of a representative lapped transform having the pre-filter and block transform formulation of FIG. 5.

FIG. 12 is a diagram illustrating pixel components in the two-dimensional data and corresponding parallelized component vectors over which an overlap operator (pre-filter) portion of the two-dimensional lapped biorthogonal transform is applied, and to which a 2×2 Hadamard operator portion of the overlap operator is applied.

DETAILED DESCRIPTION

The following description relates to coding and decoding techniques that provide a faster implementation of lapped transform as parallelized or SIMD operations [hereafter "transform parallelization technique"]. The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this transform parallelization technique is an image or video compression system. Alternatively, the technique also can be incorporated into compression systems or codecs for other 2D data. The transform parallelization technique does not require that the digital media compression system encodes the compressed digital media data in a particular coding format.

1. Encoder/Decoder

Figure 3:
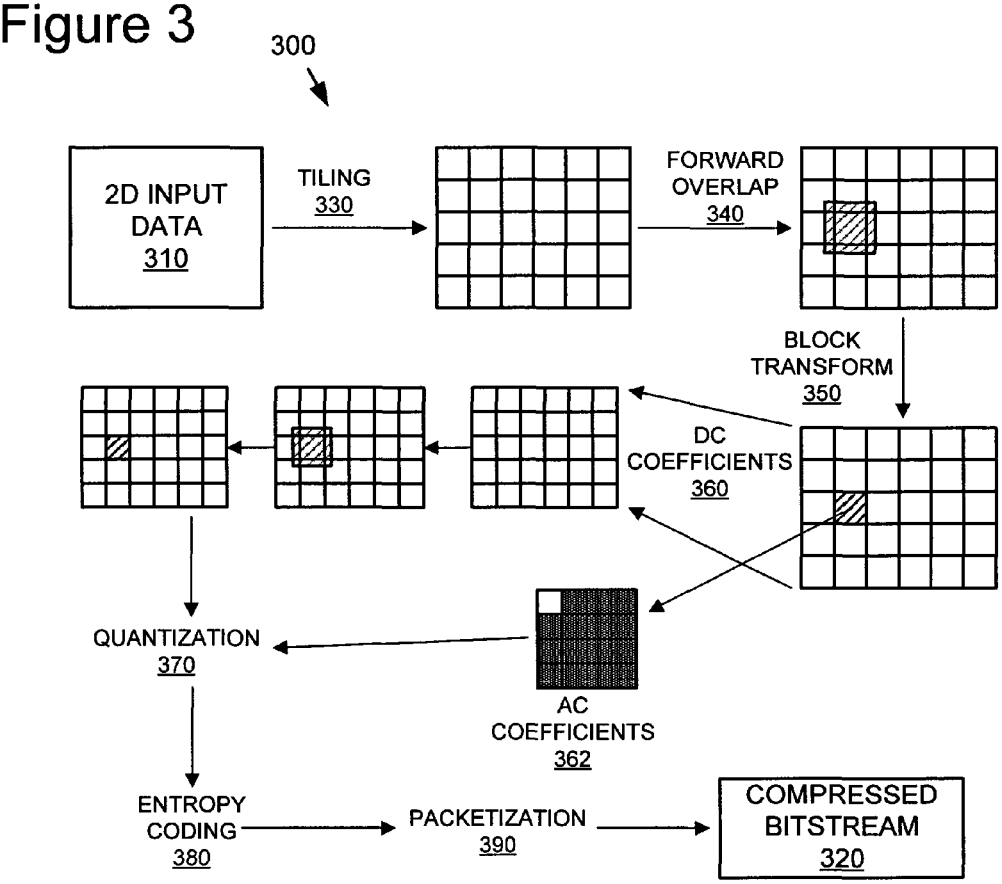
FIG. 3 is a flow diagram of a representative encoder incorporating the adaptive coding of wide range coefficients.
Figure 4:
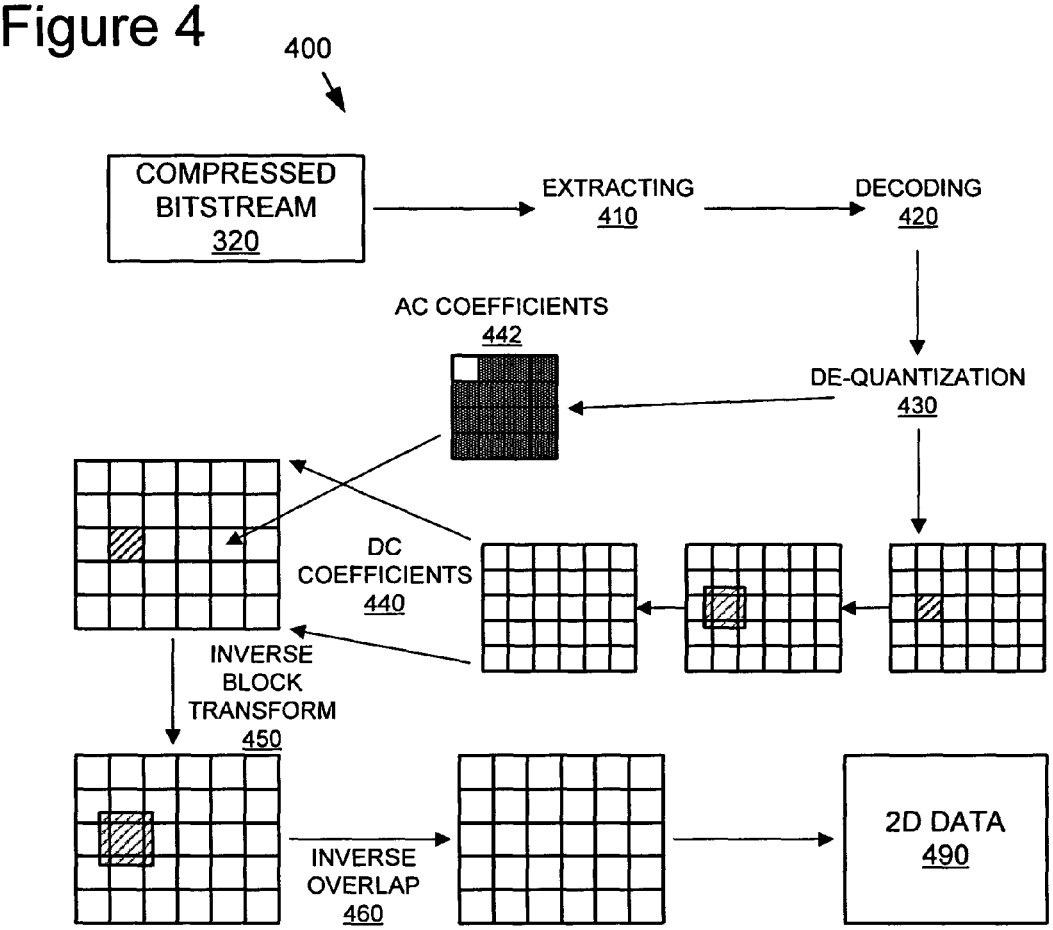
FIG. 4 is a flow diagram of a decoder incorporating the decoding of adaptively coded wide range coefficients.

FIGS. 3 and 4 are a generalized diagram of the processes employed in a representative 2-dimensional (2D) data encoder 300 and decoder 400. The diagrams present a generalized or simplified illustration of a compression system incorporating the 2D data encoder and decoder that implement the transform parallelization technique. In alternative compression systems using the transform parallelization technique, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 300 produces a compressed bitstream 320 that is a more compact representation (for typical input) of 2D data 310 presented as input to the encoder. For example, the 2D data input can be an image, a frame of a video sequence, or other data having two dimensions. The 2D data encoder tiles 330 the input data into macroblocks, which are 16×16 pixels in size in this representative encoder. The 2D data encoder further tiles each macroblock into 4×4 blocks. A "forward overlap" operator 340 is applied to each edge between blocks, after which each 4×4 block is transformed using a block transform 350. This block transform 350 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004, the disclosure of which is hereby incorporated herein by reference. The overlap operator 340 can be the reversible overlap operator described by Tu et al., U.S. patent application Ser. No. 11/015,148, entitled, "Reversible Overlap Operator for Efficient Lossless Data Compression," filed Dec. 17, 2004, the disclosure of which is hereby incorporated herein by reference; and by Tu et al., U.S. patent application Ser. No. 11/035,991, entitled, "Reversible 2-Dimensional Pre-/Post-Filtering For Lapped Biorthogonal Transform," filed Jan. 14, 2005, the disclosure of which is hereby incorporated herein by reference. The overlap operator and transform together effect a lapped biorthogonal transform. Alternatively, the discrete cosine transform or other block transforms and overlap operators can be used. Subsequent to the transform, the DC coefficient 360 of each 4×4 transform block is subject to a similar processing chain (tiling, forward overlap, followed by 4×4 block transform). The resulting DC transform coefficients and the AC transform coefficients are quantized 370, entropy coded 380 and packetized 390.

The decoder performs the reverse process. On the decoder side, the transform coefficient bits are extracted 410 from their respective packets, from which the coefficients are themselves decoded 420 and dequantized 430. The DC coefficients 440 are regenerated by applying an inverse transform, and the plane of DC coefficients is "inverse overlapped" using a suitable smoothing operator applied across the DC block edges. Subsequently, the entire data is regenerated by applying the 4×4 inverse transform 450 to the DC coefficients, and the AC coefficients 442 decoded from the bitstream. Finally, the block edges in the resulting image planes are inverse overlap filtered 460. This produces a reconstructed 2D data output.

In an exemplary implementation, the encoder 300 (FIG. 3) compresses an input image into the compressed bitstream 320 (e.g., a file), and the decoder 400 (FIG. 4) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 310 compressed by the illustrated encoder 300/decoder 400 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 300 tiles the input image or picture into macroblocks. In an exemplary implementation, the encoder 300 tiles the input image into 16×16 macroblocks in the Y channel (which may be 16×16, 16×8 or 8×8 areas in the U and V channels depending on the color format). Each macroblock color plane is tiled into 4×4 regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a YUV4:2:2 format color image, each macroblock contains 16 4×4 Y blocks, and 8 each 4×4 chrominance (U and V) blocks.
4. For a RGB or YUV4:4:4 color image, each macroblock contains 16 blocks each of Y, U and V channels.

2. Fast SIMD Lapped Biorthogonal Transform Overview

One of the more computationally complex operations in the above-described representative encoder 300 (FIG. 3) and decoder 400 (FIG. 4) is the lapped biorthogonal transform. The complexity of this operation impacts the performance of both the encoder and the decoder.

The implementation of the lapped biorthogonal transform that is described in the patent applications (Srinivasan, U.S. patent application Ser. No. 11/015,707, entitled, "Reversible Transform For Lossy And Lossless 2-D Data Compression," filed Dec. 17, 2004; Tu et al., U.S. patent application Ser. No. 11/015,148, entitled, "Reversible Overlap Operator for Efficient Lossless Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005) is designed to minimize complexity. However, the transform parallelization techniques described herein achieve a further speed-up by formulating the lapped transform operations in a SIMD (single instruction, multiple data) or parallel-instruction friendly manner. The SIMD operations can be used to compute multiple instructions in parallel. Such SIMD instructions are supported on a variety of processors, including the Pentium® family processors from Intel, various x86-compatible processors from AMD, PowerPC® and a variety of other DSPs (digital signal processors).

The transform parallelization technique described herein reformulates a lapped (or other) transform as a set of operations that are largely SIMD friendly. This is achieved by remapping the input and output sampling grids of the lapped transform. By this remapping, the input data can be grouped into "vectors" or parallel units. With this rearrangement, many of the lapped transform steps can be executed as vector operations. The few remaining operations that are not vectorizable are performed on the vector components in a sequential manner.

Although the technique can be applied to lapped transforms in general, a specific application of the technique to the lapped biorthogonal transform of the representative encoder and decoder (i.e., the lapped biorthogonal transform detailed in the above-listed patent applications) is discussed herein below for purposes of illustration. The transform parallelization technique remaps and groups the input sampling grid or lattice of the representative lapped biorthogonal transform such that each group of data samples can be treated as a vector for many of the operations implementing the lapped transform. In this particular lapped biorthogonal transform example, the techniques are applied to formulate SIMD-friendly versions of 4-point overlap operators and 4-point block transforms, but the techniques can be generalized to other transform lengths as well. Further, the technique alternatively can be applied to create SIMD or parallel instruction versions of other lapped transform realizations.

The following sections detail both one- and two-dimensional SIMD-friendly implementations of the representative lapped biorthogonal transform. In the one dimensional case, two elements may be grouped together into a vector, and many of the 1D lapped transform operations may be performed using vector operations. In the two dimensional case, two or four elements may be grouped together into a vector, and many of the lapped transform operations may be performed using vector operations.

These vectorization techniques are equally applicable to the forward and inverse transforms (used by the encoder and decoder, respectively).

2.1 SIMD Realization of One-Dimensional Lapped Biorthogonal Transform

Figure 1:
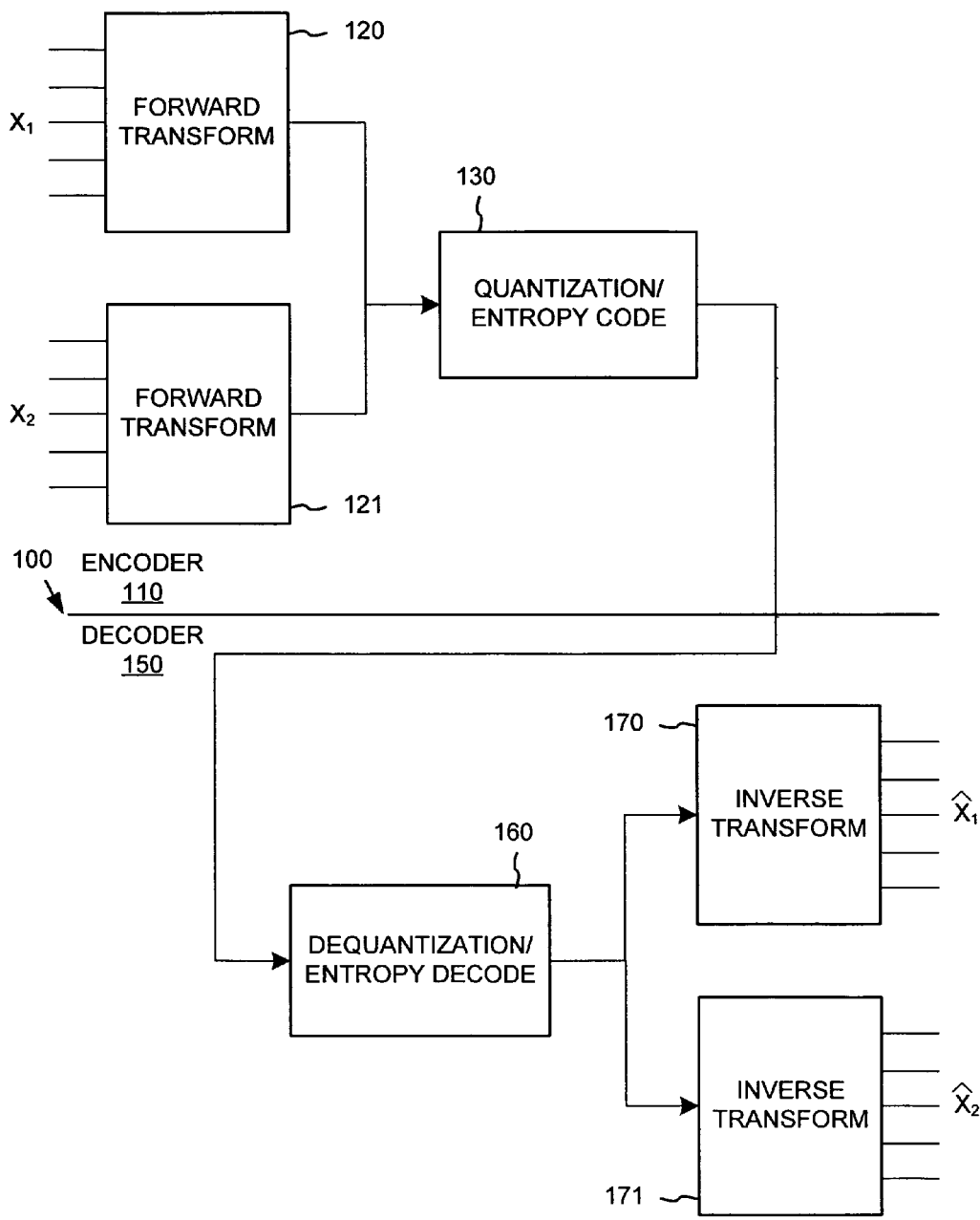
FIG. 1 is a block diagram of a conventional block transform-based codec in the prior art.
Figure 2:
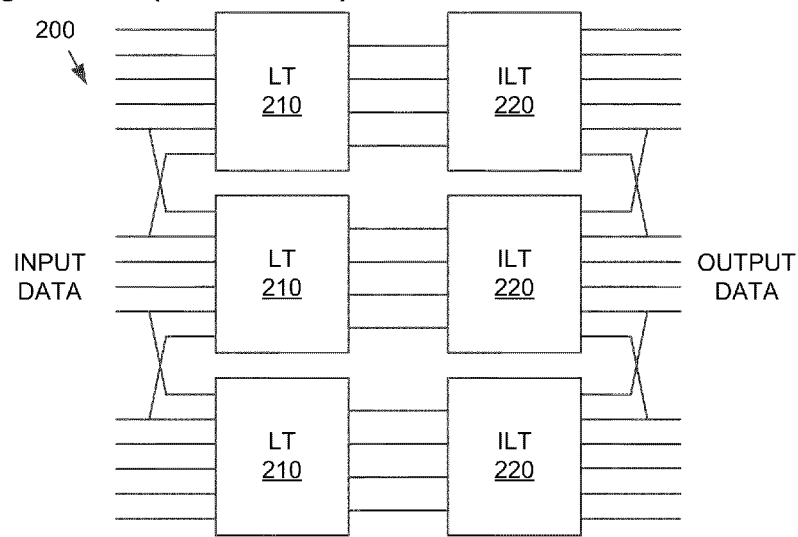
FIG. 2 is a flow diagram illustrating an example of a lapped transform.
Figure 5:
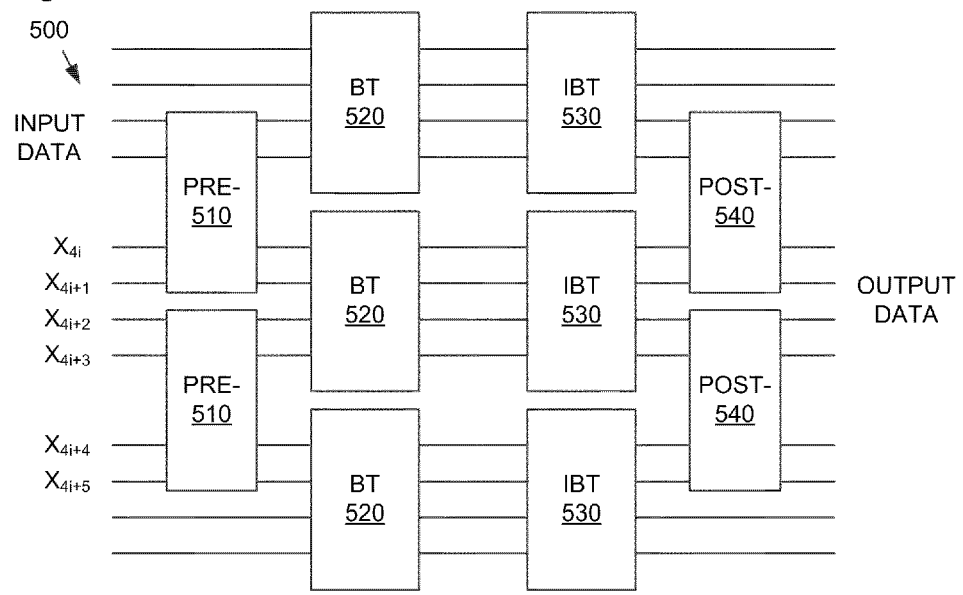
FIG. 5 is a flow diagram illustrating an example lapped transform formulation as a pre-filter (or overlap operator) and block transform, where the pre-filter is applied across input boundaries or block edges of the block transform.

With reference to FIG. 5, consider a general case of a lapped transform 500 formulated as a pre-filter (overlap operator) 510 and block transform 520. In the illustrated example case, the block transform 520 has a block size of 4, and the pre-filter 510 has an overlap size of 4 as well. The overlap size is defined as the pre/post filter length. Thus, if the data sequence is numbered $x_0$, $x_1$, $x_2$, $x_3$, etc., the lapped transform 500 proceeds as follows:

1. The pre-filter 510 is applied to each set of input data $[x_{4i+2}, x_{4i+3}, x_{4i+4}, x_{4i+5}]$; and
2. The block transform 520 is applied to each set $[x_{4i}, x_{4i+1}, x_{4i+2}, x_{4i+3}]$.

In alternative implementations, the lapped transform can be defined with other, different block transform size and overlap size.

FIG. 6 illustrates a more specific example of a lapped biorthogonal transform 600 that has the pre-filter and block transform formulation as illustrated in FIG. 5. The lapped biorthogonal transform 600 is that described above as being used in the representative encoder 300 (FIG. 3) and decoder 400 (FIG. 4), whose implementation is detailed more specifically in the patent applications: Srinivasan, U.S. patent application Ser. No. 11/015,707, entitled, "Reversible Transform For Lossy And Lossless 2-D Data Compression," filed Dec. 17, 2004; Tu et al., U.S. patent application Ser. No. 11/015,148, entitled, "Reversible Overlap Operator for Efficient Lossless Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005. For simplicity, the pre-filter and block transform of the encoder 300 are depicted in FIG. 6. The post-filter and inverse block transform of the inverse lapped transform for the decoder is an inverse of the forward lapped transform 600. As shown in FIG. 6, the pre-filter has an implementation as a set of butterfly or lifting step operations organized as a first butterfly stage 610, rotation/scaling 620, and second butterfly stage 630. The block transform has an implementation as a third butterfly stage 640 and a rotation 650.

One way to parallelize operations for realization using SIMD instructions is by simply grouping together like-indexed signal components across blocks. In other words, the components of the form $x_{4i+j}$ for some j are grouped together. For the specific lapped biorthogonal transform 600 example considered here, vectors of 2 components can be: $[x_{14} \, x_{18}]$, $[x_{15} \, x_{19}]$, $[x_{16} \, x_{20}]$, and $[x_{17} \, x_{21}]$.

This grouping works well for the pre-filter. However for the block transform, the vectors $[x_{14} \, x_{18}]$ and $[x_{16} \, x_{20}]$ straddle three, and not two blocks. This means that this grouping cannot be used to achieve overall speed up the lapped transform. At the transform stage, the desired grouping is different: $[x_{16} \, x_{20}]$, $[x_{17} \, x_{21}]$, $[x_{18} \, x_{22}]$, and $[x_{19} \, x_{23}]$.

Comparing the desired groupings for the pre-filter and block transform, it can be seen that two of the vectors are common to both groupings (i.e., $[x_{16} \, x_{20}]$ and $[x_{17} \, x_{21}]$). However, the remaining two vectors are different between the groupings, which would necessitate regrouping of vectors between the pre-filter and block transform. This is not a desirable solution.

On the other hand, the transform parallelization technique presents an alternative way to parallelize the 1D lapped transform. With the alternative technique, a permutation is added between certain components before or after the lapped transform, such that the groupings of components into SIMD instruction vectors are common to both the pre-filter and block transform stages.

Figure 7:
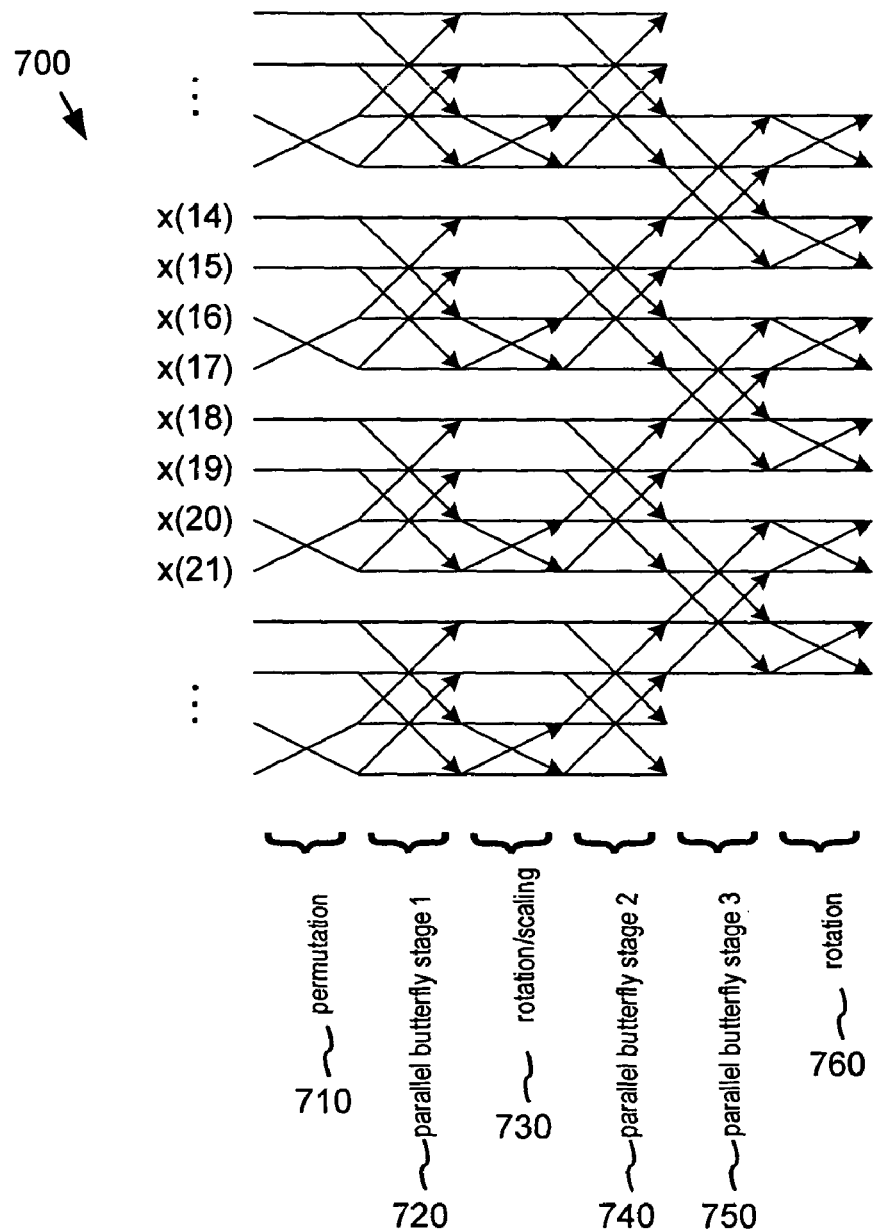
FIG. 7 is a signal flow graph of a parallelized SIMD version of a representative lapped biorthogonal transform having the pre-filter and block transform formulation of FIG. 6.

FIG. 7 shows a modified realization 700 of the lapped biorthogonal transform of FIG. 6, which has been parallelized according to the transform parallelization technique described herein. This modified lapped transform realization 700 is functionally identical to the lapped biorthogonal transform implementation 600 of FIG. 6, but includes a twist or permutation 710 of components in the first stage, followed by a slightly different network of butterflies 720, 740 and 750. These butterfly stages can be implemented in parallel with 2 component vectors, since for these stages odd components interact only with odd components and even components interact only with even components. Further, the operations for odd components and even components are identical in these stages. Thus, grouping of adjacent odd and even components realizes a parallel implementation.

Nevertheless, some of the stages of the SIMD realization 700 of the lapped biorthogonal transform still are not parallelizable. The rotation/scaling step 730 in the pre-filter, and the rotation step 760 in the block transform are implemented sequentially.

Figures 8, 9:
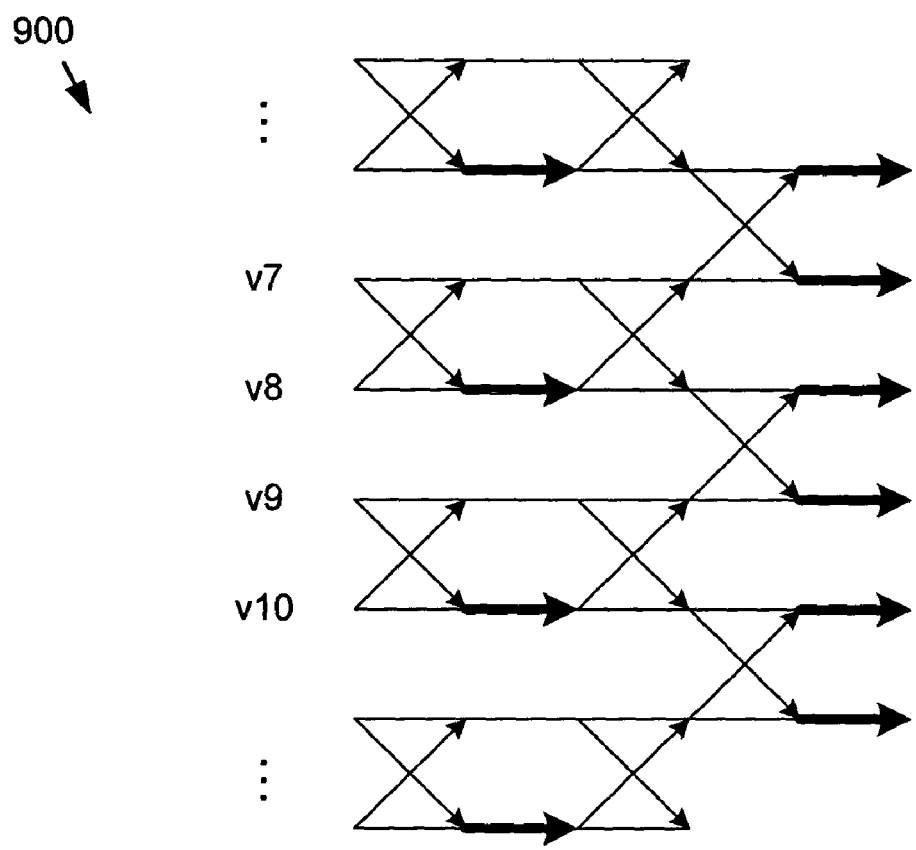
FIG. 8 is a diagram illustrating grouping of one-dimensional data into 2-component vectors used in the parallelized SIMD version of the one-dimensional lapped biorthogonal transform of FIG. 7.
FIG. 9 is a vector signal flow graph of the one-dimensional lapped biorthogonal transform of FIG. 7.

FIG. 9 depicts a realization 900 of the lapped biorthogonal transform 700 (FIG. 7) using the arrangement of the data into 2-component vectors as shown in FIG. 8. In FIG. 9, the data paths are 2-component vector valued, and the bold arrows are in-vector operations (i.e., operations between components of the same vector). The vector grouping shown in FIG. 8 is used for the input, which is based on the following component-to-vector mapping rule:

$$v_{2i} = [x_{4i} x_{4i+1}]$$

$$v_{2i+1} = [x_{4i+3} x_{4i+2}]$$

This mapping groups the original signal into 2-component vectors, to which SIMD arithmetic is applied for many of the lapped transform steps, and sequential processing is applied for the remaining steps.

2.2 SIMD Realization of Two-Dimensional Lapped Biorthogonal Transform

The 2-dimensional lapped biorthogonal transform (2D LBT) can be implemented using the 1-dimensional lapped biorthogonal transform (1D LBT) just described. In such implementation, the 1D LBT is applied to each row of the image followed by a 1D LBT applied to each column (or vice versa). In this case, two types of vectorization techniques may be used:

1. In the first type of vectorization, the same grouping used in the 1D LBT (as described in section 2.1 above) may be used for both the horizontal and vertical transforms.
2. In the second type of vectorization, the vectors may be formed by grouping together like-indexed components of multiple rows while implementing the 1D LBT along rows, and by grouping together like-indexed components of multiple columns while implementing the 1D LBT along columns.

In both these techniques, the vectorization changes between the row and column transforms. This incurs an additional cost of remapping from one vectorization format to another during the computation of the transform, which may be expensive. An alternative vectorization technique that does not involve reshuffling between transform stages is described below.

Further, the 2D LBT described in the above listed patent applications (i.e., Srinivasan, U.S. patent application Ser. No. 11/015,707, entitled, "Reversible Transform For Lossy And Lossless 2-D Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005) implements the LBT directly in 2 dimensions. This transform cannot be separated into two 1D operations.

Figure 10:
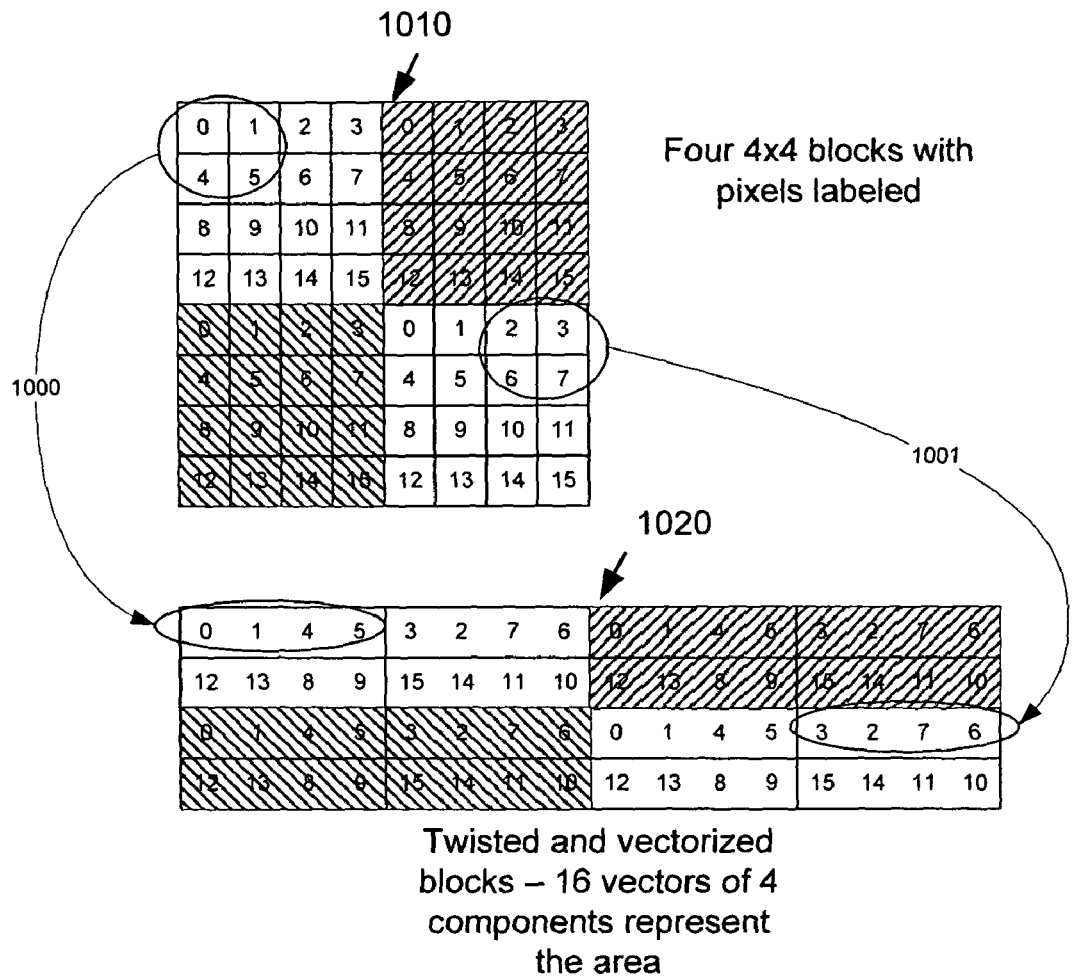
FIG. 10 is a diagram illustrating grouping of two-dimensional data into 4-component vectors used in the parallelized SIMD version of the two-dimensional lapped biorthogonal transform.
Figure 11:
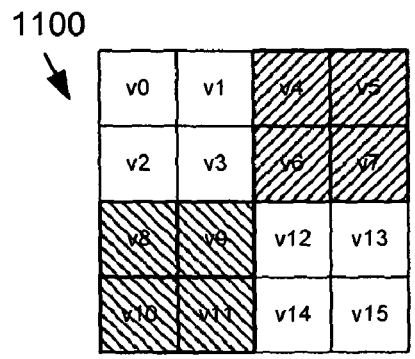
FIG. 11 is a diagram illustrating a vector notation for the two-dimensional data as per the grouping into vectors as shown in FIG. 10

For a parallelized SIMD version of this direct 2D LBT implementation (and also for the separable 2D implementation), a bidirectionally twisted remapping 1000-1001 is first applied as shown in FIG. 10. Each 4×4 block of pixels within an area 1010 is mapped 1000-1001 into four 4-component vectors within area 1020, such that each vector contains pixels from the 2×2 sub-blocks of the 4×4 block. The ordering of components within vectors follows a two dimensional extension of the 1D remapping (the permutation 710 shown in FIG. 7) described above. FIG. 11 shows a vector notation 1100 for the resulting set of 4-component vectors in area 1020.

Figure 12:
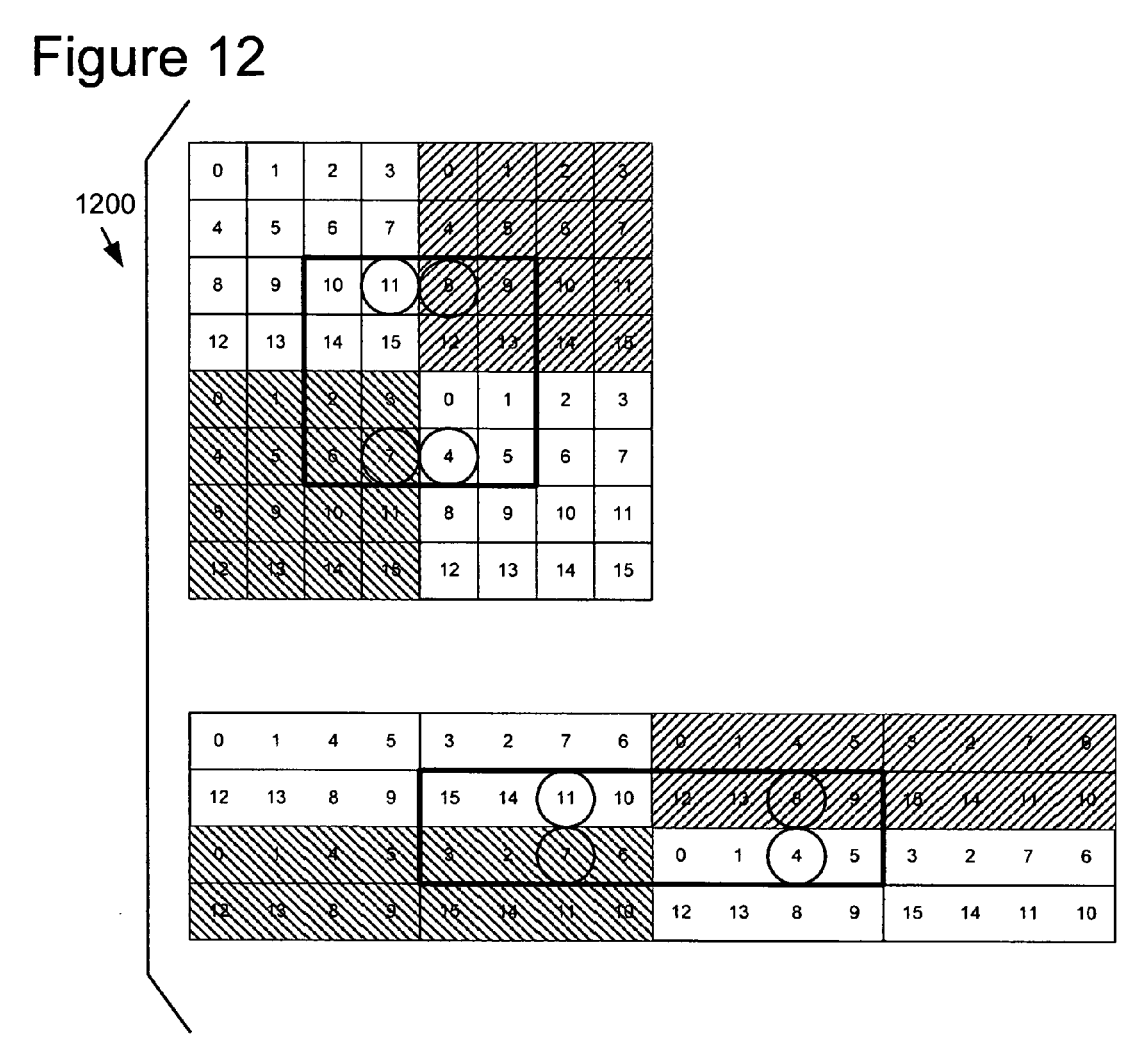

The 4-component vectors thus formed have the property that groups of 4 pixels to which Hadamard transforms are applied either in the overlap operator stage or in the block transform stage of the direct 2D LBT are aligned in the same position within the vectors. This is illustrated in FIG. 12 for the overlap operator and in FIG. 13 for the Photon Core Transform, and is explained in detail below.

2.2.1 Parallel Implementation of the Overlap Operator in the SIMD Realization of Two-Dimensional Lapped Biorthogonal Transform With reference again to FIG. 5, the overlap operator (pre-filter 510) in a lapped transform is applied across block boundaries. This may be done either before or after the block transform 520.

In the case of the 2D LBT implementation described in the above-listed patent applications (i.e., Srinivasan, U.S. patent application Ser. No. 11/015,707, entitled, "Reversible Transform For Lossy And Lossless 2-D Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005), the overlap operator is applied prior to the block transform on the encoder side. Likewise, it is applied after the inverse block transform on the decoder side. Disregarding the special cases at boundaries of the image, the overlap operator is applied to a 4×4 area straddling 4 4×4 blocks.

Figure 14:
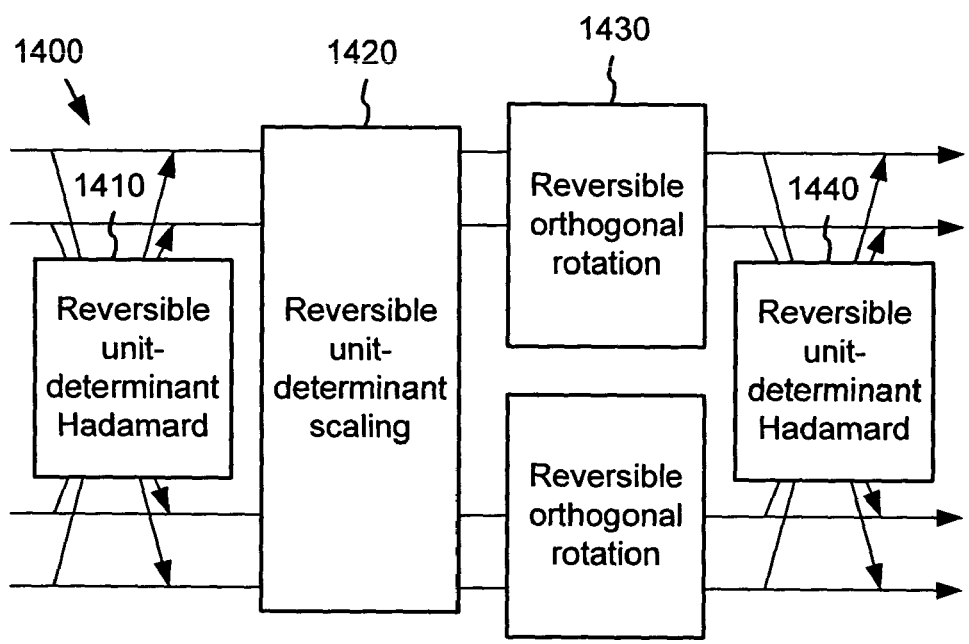
FIG. 14 is a diagram illustrating an overlap operator of the two-dimensional lapped biorthogonal transform.

With reference to FIG. 14, the overlap operator 1400 of this 2D LBT implementation consists of two 2×2 Hadamard transforms 1410 applied to quads of pixels located symmetrically in the grid, followed by a rotation & scaling stage 1420, and 1430, followed by another 2×2 Hadamard transform 1440 applied to the same pixel quads. Details of the operations are presented by Tu et al., U.S. patent application Ser. No. 11/035,991, entitled, "Reversible 2-Dimensional Pre-/Post-Filtering For Lapped Biorthogonal Transform," filed Jan. 14, 2005. A further simplification can be used in the 2D LBT formulation as described in this patent application, where the scaling stage and one of the 2×2 Hadamard stages cancel out some operations.

Figure 15:
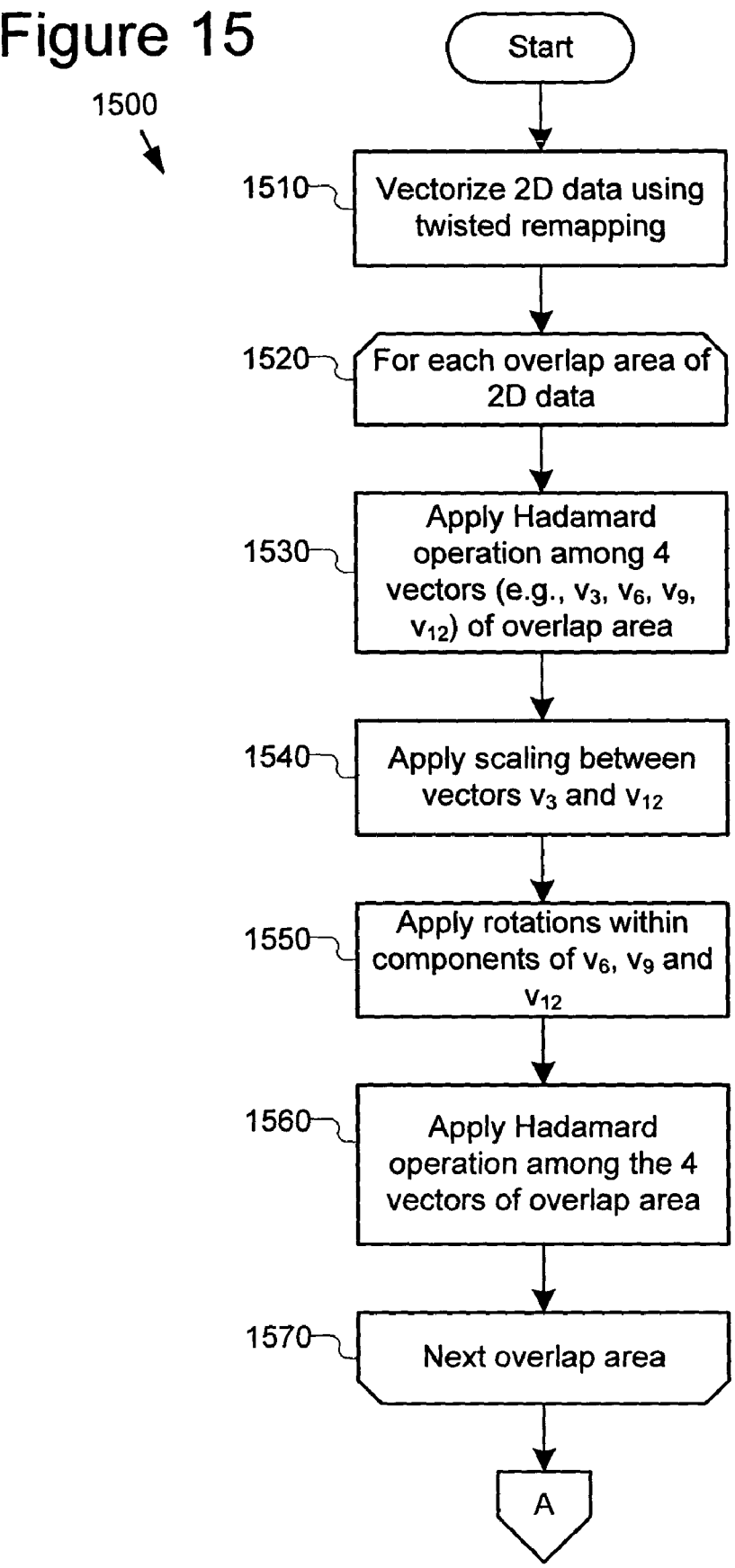
FIG. 15 is a flow diagram illustrating a process implementing the overlap operator of the parallelized two-dimensional lapped biorthogonal transform.

For the parallelized SIMD version of this overlap operator, the same vectorization procedure described in section 2.2 above and shown in FIGS. 10 and 11 is first applied. With reference to FIG. 15, the parallelized SIMD version of the overlap operator based on this vectorized data is implemented according to the following process 1500:

1. As indicated at action 1510, the image or other 2 dimensional data working area is vectorized into 4-component vectors as shown in FIGS. 10 and 11.
2. The overlap operation in actions 1520-1570 is performed on each 4×4 overlap area straddling 4 4×4 blocks 1200 over the image, as illustrated in FIG. 12. For this operation, the vectors identified as [$v_3$ $v_6$ $v_9$ $v_{12}$] using the vector notation shown in FIG. 11 are used. These steps are repeated for all such areas.
3. First, the 2×2 Hadamard operation is performed among these 4 vectors at action 1530.
4. For the next action 1540, the scaling operation (which is detailed in the patent applications: Tu et al., U.S. patent application Ser. No. 11/015,148, entitled, "Reversible Overlap Operator for Efficient Lossless Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005) is performed between the vectors $v_3$ and $v_{12}$.
5. Rotations 1550 are performed within components of the vectors, $v_6$, $v_9$ and $v_{12}$. These are mostly sequential operations that largely do not exploit parallelism of data.
6. Finally, the 2×2 Hadamard operation is again performed at action 1560 among the four vectors [$v_3$ $v_6$ $v_9$ $v_{12}$] of the overlap area.

In the process 1500, the above operations are performed in-place on the indicated vectors. Further, in practice, there are some cancellations between the steps 3 and 4 above which lead to further simplifications, as detailed in the patent applications: Tu et al., U.S. patent application Ser. No. 11/015,148, entitled, "Reversible Overlap Operator for Efficient Lossless Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005.

2.2.2 Parallel Implementation of the Block Transform in the SIMD Realization of Two-Dimensional Lapped Biorthogonal Transform After the overlap operator is applied to all 2×2 subblocks within a block, the 4×4 block 1300 (FIG. 13) is ready to be block transformed. The block transform operation keeps the same vectorization—hence it is not necessary to shuffle data between the overlap and block transform operations.

Figure 16:
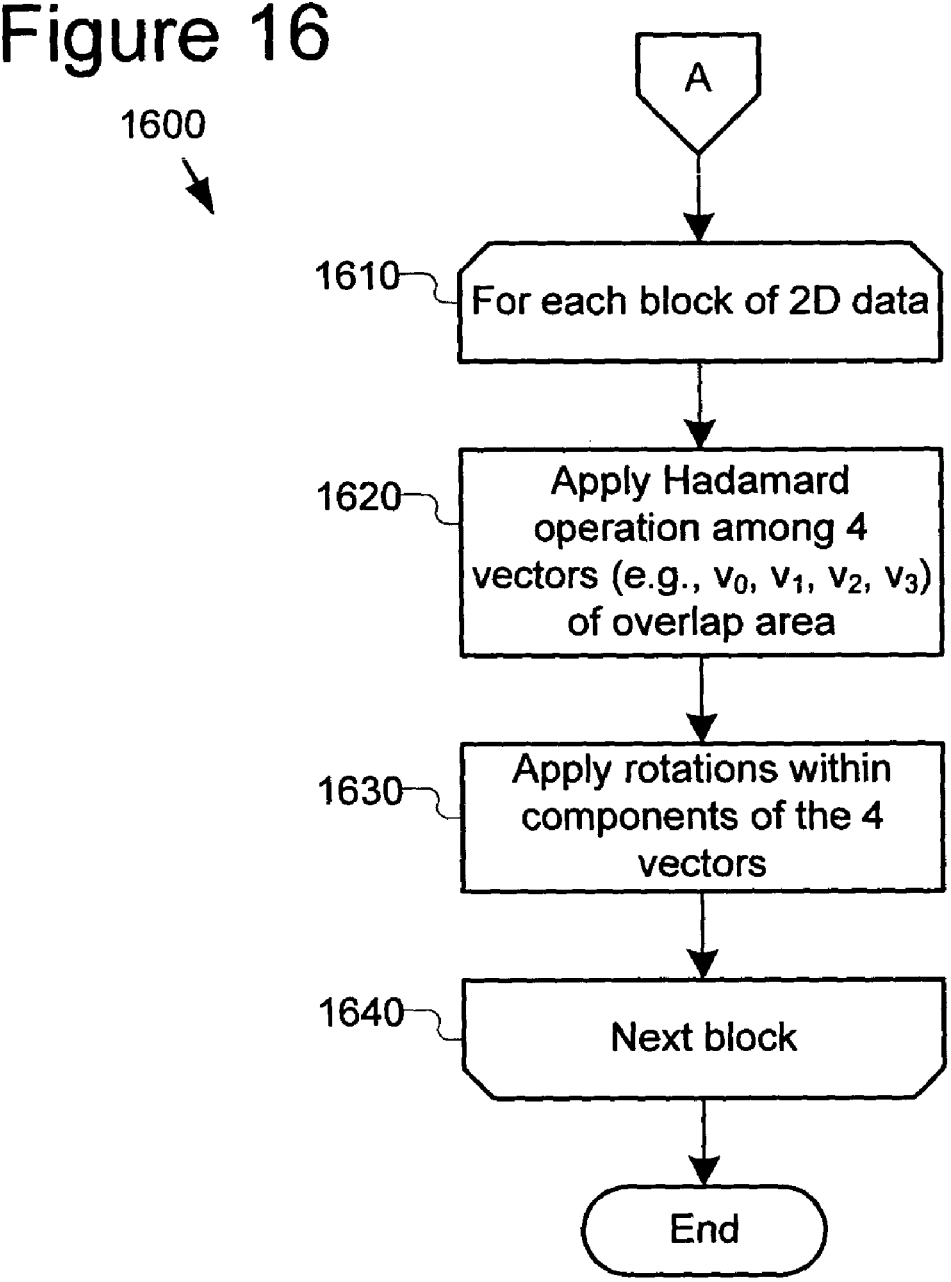
FIG. 16 is a flow diagram illustrating a process implementing the block transform of the parallelized two-dimensional lapped biorthogonal transform.

With reference to FIG. 16, the parallel implementation of the block transform is performed according to the following process 1600. The process begins with the image or working area still vectorized by the action 1510 (FIG. 15) for the overlap operator as shown in FIGS. 10 and 11. On the other hand, in instances where the block transform is being applied to the 2D data alone without the overlap operator process 1500 being first applied, the process 1600 instead begins by performing the action 1510 to provide the same vectorization.

Figure 13:
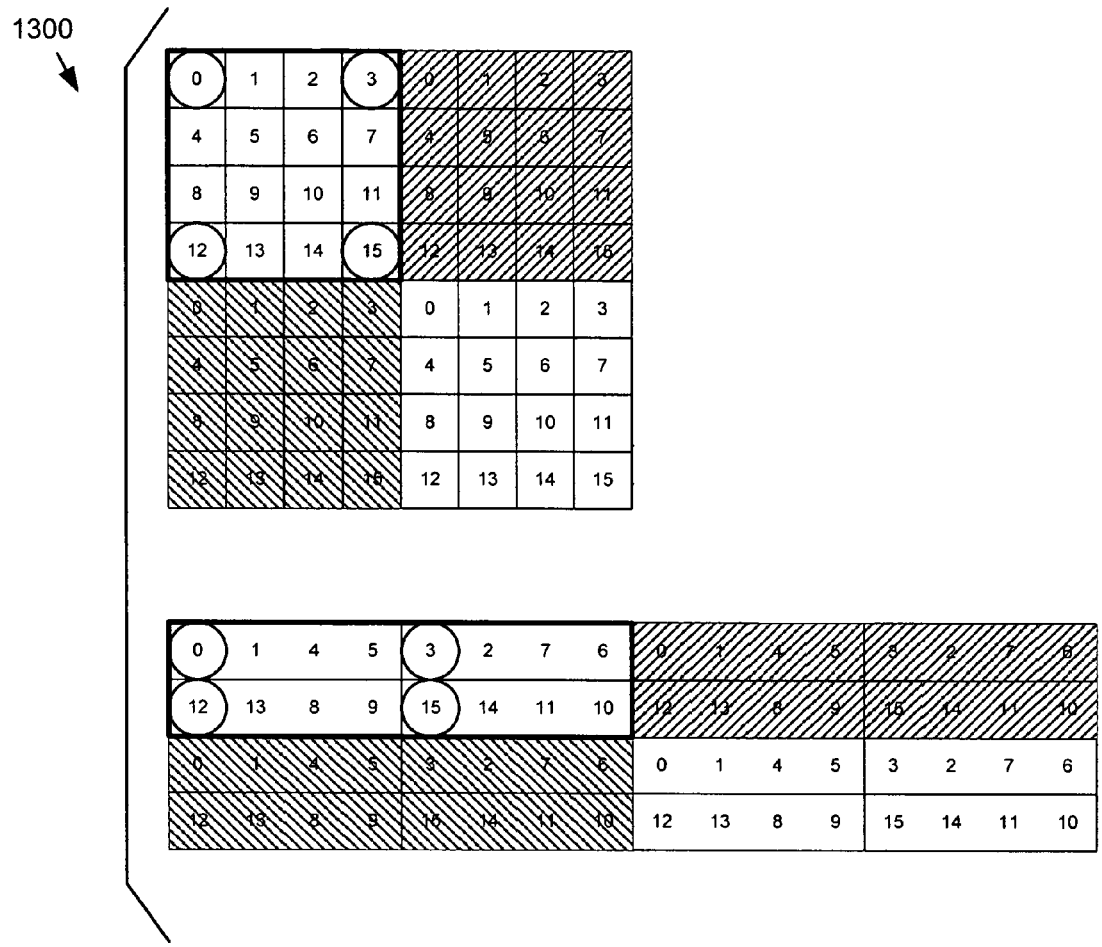
FIG. 13 is a diagram illustrating pixel components in the two-dimensional data and corresponding parallelized component vectors over which a block transform portion of the two-dimensional lapped biorthogonal transform is applied, and to which a 2×2 Hadamard operator portion of that block transform is applied.

1. In the loop of actions 1610-1640, the transform is applied to each 4×4 block 1300 of the image. For example, the vectors [$v_0$ $v_1$ $v_2$ $v_3$] shown in FIG. 13 are used for the top left block. These steps are repeated for all blocks.
2. At a first action 1620, the 2×2 Hadamard operation is performed among these 4 vectors.
3. At next action 1630, rotations are performed within components of the vectors, $v_0$, $v_1$, $v_2$ and $v_3$. These are mostly sequential operations that largely do not exploit parallelism of data. The rotations performed are as detailed in the patent applications: Srinivasan, U.S. patent application Ser. No. 11/015,707, entitled, "Reversible Transform For Lossy And Lossless 2-D Data Compression," filed Dec. 17, 2004; and Tu et al., U.S. patent application Ser. No. 11/035,991, entitled, "Reversible 2-Dimensional Pre-/Post-Filtering For Lapped Biorthogonal Transform," filed Jan. 14, 2005.

In alternative implementations of the SIMD lapped transform, the transform operations applied to the vectors of the block can be those of other DCT-like transforms (instead of the reversible transform described in the above-listed patent applications).

2.3 Extensions

For both the overlap operator 1500 and transform 1600 processes, a four way 2×2 Hadamard transform is a fundamental and repeated operation. With the data components ordered by the vectorization illustrated in FIGS. 10 and 11, the 2×2 Hadamard is easily performed as SIMD instructions operating on these vectors. Further, for the overlap operator, the scaling operation likewise can be performed as SIMD instructions that operate on these vectors. The rotations (actions 1550, 1630) are partially parallelizable. This is so because some of the rotations involved are identical 1D operations that are performed for two pairs of data points within the 4 component vector. These rotations can also be parallelized with multiply and shift operations.

Due to reordering of data components in the vectors, the final output of the transform is also re-ordered. This is typically not an issue because the transform is scanned to order the coefficients as a list for output by the encoder in the compressed bitstream. In the parallel implementation, the scan array takes into account re-ordering and has no negative impact on the algorithm complexity.

The same parallelization technique holds for the inverse lapped biorthogonal transform, except the order of block transform and overlap operator is reversed, and the order of actions 1530-1560 and 1620-1630 in the respective process is reversed. The reordered scan pattern is used to populate the input data array, and the output is afterwards remapped in a manner inverse to the mapping shown in FIG. 10.

The parallelization technique also holds for alternative implementations using other versions of lapped orthogonal/biorthogonal transforms. As noted in the discussion of the block transform process 1600, the parallelization may be used for block transforms by themselves (i.e. without the overlap operator) as well. Transform and overlap sizes other than 4, and dimensions greater than 2 may also be accommodated with straightforward extension of the parallelization logic.

The cost of vectorization is minimized by performing the remapping to the twisted lattice on the encoder, and remapping from the twisted lattice on the decoder, during the stage of color conversion. Color conversion in the decoder is generally implemented sequentially due to several reasons including (i) multitude of color formats, (ii) lack of word alignment due to 24 bit pixel boundaries of many color formats, (iii) need to perform clipping on decoder side, and etc. The additional cost of remapping over and above color conversion is minimal and facilitates use of this parallelization technique for overall performance improvement. Further, when the input image is presented in a rotated and/or laterally inverted orientation or when the output image is desired in a rotated and/or laterally inverted orientation, this can be achieved with almost no increase in the overall computational complexity.

3. Computing Environment

The above described representative encoder 300 (FIG. 3) and decoder 400 (FIG. 4) incorporating the Lapped Biorthogonal Transform implemented using the transform parallelization techniques can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 17.

Figure 17:
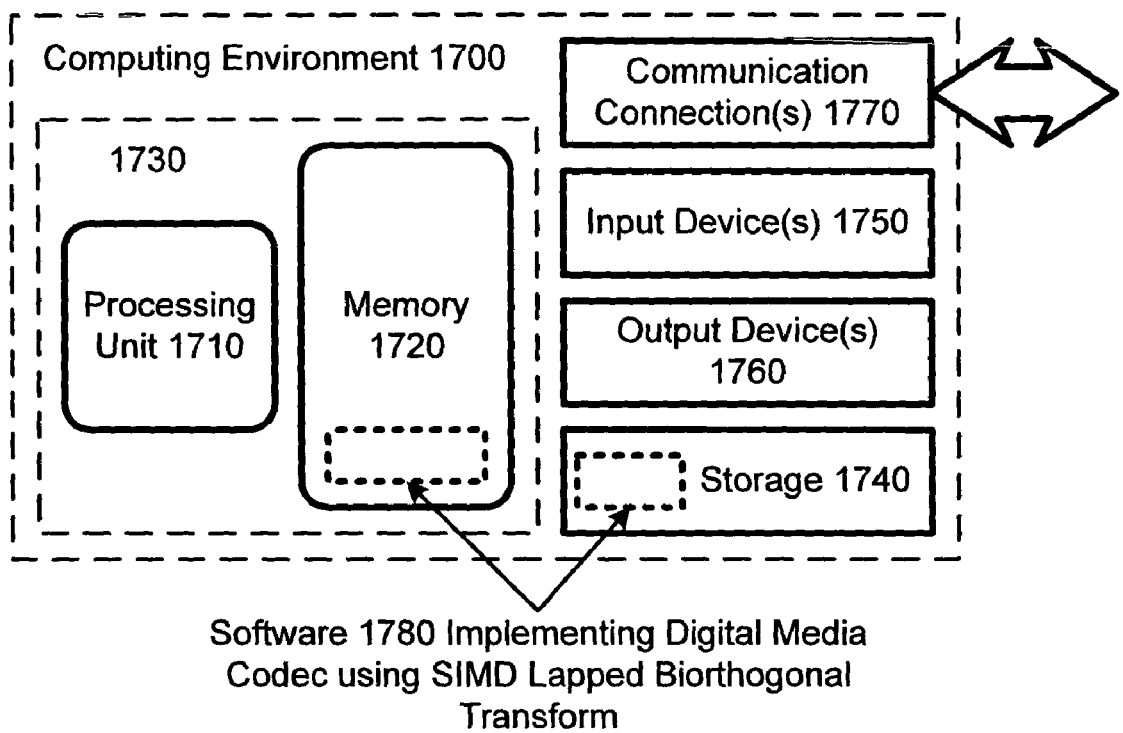
FIG. 17 is a block diagram of a suitable computing environment for implementing the parallelized SIMD version of the representative encoder/decoder of FIGS. 3 and 4.

FIG. 17 illustrates a generalized example of a suitable computing environment (1700) in which described embodiments may be implemented. The computing environment (1700) is not intended to suggest any limitation as to scope of use or functionality of the invention, as the present invention may be implemented in diverse general-purpose or special-purpose computing environments.

With reference to FIG. 17, the computing environment (1700) includes at least one processing unit (1710) and memory (1720). In FIG. 17, this most basic configuration (1730) is included within a dashed line. The processing unit (1710) executes computer-executable instructions and may be a real or a virtual processor. In a multi-processing system, multiple processing units execute computer-executable instructions to increase processing power. The memory (1720) may be volatile memory (e.g., registers, cache, RAM), non-volatile memory (e.g., ROM, EEPROM, flash memory, etc.), or some combination of the two. The memory (1720) stores software (1780) implementing the described digital media encoding/decoding and transform parallelization techniques.

A computing environment may have additional features. For example, the computing environment (1700) includes storage (1740), one or more input devices (1750), one or more output devices (1760), and one or more communication connections (1770). An interconnection mechanism (not shown) such as a bus, controller, or network interconnects the components of the computing environment (1700). Typically, operating system software (not shown) provides an operating environment for other software executing in the computing environment (1700), and coordinates activities of the components of the computing environment (1700).

The storage (1740) may be removable or non-removable, and includes magnetic disks, magnetic tapes or cassettes, CD-ROMs, CD-RWs, DVDs, or any other medium which can be used to store information and which can be accessed within the computing environment (1700). The storage (1740) stores instructions for the software (1780) implementing the described encoder/decoder using the transform parallelization techniques.

The input device(s) (1750) may be a touch input device such as a keyboard, mouse, pen, or trackball, a voice input device, a scanning device, or another device that provides input to the computing environment (1700). For audio, the input device(s) (1750) may be a sound card or similar device that accepts audio input in analog or digital form, or a CD-ROM reader that provides audio samples to the computing environment. The output device(s) (1760) may be a display, printer, speaker, CD-writer, or another device that provides output from the computing environment (1700).

The communication connection(s) (1770) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1700), computer-readable media include memory (1720), storage (1740), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of encoding digital media data, the method comprising:
    using a computing device that implements an encoder,
        re-mapping components of blocks of input digital media data into a set of vectors on which operations of a lapped transform can be applied across the components of blocks on a single instruction, multiple data basis;
        applying the lapped transform to blocks of the digital media data to produce a set of transform coefficients for the respective blocks, wherein applying the lapped transform comprises performing at least one operation on a single instruction, multiple data basis on the vectors of components for a block; and
        encoding the transform coefficients in a compressed bitstream,
    wherein the lapped transform is a lapped biorthogonal transform comprising an overlap filter and a block transform, the block transform being applied to blocks of the input digital media data and the overlap filter being applied to overlap areas overlapping adjoining blocks,
    wherein said re-mapping groups components into vectors on which at least one operation of the overlap filter and at least one operation of the block transform can be applied across the components on a single instruction, multiple-data basis, and
    wherein said applying the lapped transform comprises applying at least one operation of the overlap filter and at least one operation of the block transform on a single instruction, multiple data basis on the vectors.

2. The method of claim 1, wherein the at least one operation of the overlap filter and the at least one operation of the block transform each comprise a 2×2 Hadamard transform.

3. The method of claim 1, wherein the overlap filter and the block transform each comprise a rotation operation applied to the components on a sequential instruction basis.

4. The method of claim 1, wherein the vectors are 4-component vectors.

5. A method of encoding digital media data, the method comprising:
    using a computing device that implements an encoder,
    re-mapping components of blocks of input digital media data into a set of vectors on which operations of a lapped transform can be applied across the components of blocks on a single instruction, multiple data basis;
    applying the lapped transform to blocks of the digital media data to produce a set of transform coefficients for the respective blocks, wherein applying the lapped transform comprises performing at least one operation on a single instruction, multiple data basis on the vectors of components for a block; and
    encoding the transform coefficients in a compressed bitstream,
    wherein the lapped transform is a one-dimensional lapped transform comprising an overlap filter and block transform, the block transform being applied to blocks of the input digital media data and the overlap filter being applied to overlap areas overlapping adjoining blocks,
    wherein said re-mapping groups components into vectors on which at least one operation of the overlap filter and at least one operation of the block transform can be applied across the components on a single instruction, multiple-data basis, and
    wherein said applying the lapped transform comprises applying at least one operation of the overlap filter and at least one operation of the block transform on a single instruction, multiple data basis on the vectors.

6. A method of decoding digital media data encoded according to the method of claim 1, the decoding method further comprising:
   decoding the transform coefficients from the compressed bitstream;
   ordering the decoded transform coefficients in an arrangement of vectors on which operations of an inverse of the lapped transform can be applied across the transform coefficients on a single instruction, multiple data basis;
   applying the inverse of the lapped transform to blocks of the decoded transform coefficients to reconstruct a representation of the digital media data in blocks, wherein applying the inverse of the lapped transform comprises performing at least one operation on a single instruction, multiple data basis on the vectors of transform coefficients; and
   re-mapping components of the vectors to an initial arrangement of the digital media data.

7. The method of claim 5, wherein the at least one operation of the overlap filter and the at least one operation of the block transform each comprise a butterfly stage.

8. The method of claim 5, wherein the overlap filter and the block transform each comprise a rotation operation applied to the components on a sequential instruction basis.

9. The method of claim 5, wherein the vectors are 2-component vectors.

10. The method of claim 5, wherein the digital media data is two-dimensional data, the method further comprising:
    performing said re-mapping and applying the lapped transform to rows of the two-dimensional media data; and
    performing said re-mapping and applying the lapped transform to columns of the two-dimensional media data.

11. A digital media encoder and/or decoder comprising:
    a data storage buffer for storing digital media data to be encoded and/or decoded;
    a processor programmed to:
       order elements of blocks of digital media data to/from a set of vectors on which at least some operations of a lapped transform can be applied across the components of blocks on a single instruction, multiple data basis;
       apply the lapped transform to the blocks of the digital media data, wherein applying the lapped transform comprises performing the at least some operations on the single instruction, multiple data basis on the vectors for the blocks; and
       encode/decode the digital media data to/from a compressed bitstream,
    wherein the lapped transform is a lapped biorthogonal transform having a block transform applied to adjacent blocks of the digital media data and an overlap filter applied on overlap areas straddling the adjacent blocks, and wherein said processor orders the elements of the blocks into vectors on which at least some operations of both the overlap filter and the lapped transform can be applied on the single instruction, multiple data basis.

12. The digital media encoder and/or decoder of claim 11 wherein the lapped biorthogonal transform is one-dimensional, and wherein the overlap filter and the block transform each comprise butterfly stages whose operations are applied to the vectors on the single instruction, multiple data basis.

13. The digital media encoder and/or decoder of claim 11 wherein the lapped biorthogonal transform is two-dimensional, and wherein the overlap filter and the block transform each comprise 2×2 Hadamard transforms whose operations are applied to the vectors on the single instruction, multiple data basis.

14. The digital media encoder and/or decoder of claim 11 wherein the processor is further programmed to perform said ordering of elements during a stage of color conversion of the digital media data between color formats.

15. At least one computer-readable storage device storing a computer-executable digital media processing program which when executed by a computer causes the computer to perform a method of processing digital media data, the method comprising:
   re-mapping components of blocks of digital media data into a set of vectors on which operations of a lapped transform can be applied across the components of blocks on a single instruction, multiple data basis;
   applying the lapped transform to blocks of the digital media data to produce a set of transform coefficients for the respective blocks, wherein applying the lapped transform comprises performing at least some operations on a single instruction, multiple data basis on the vectors of components for a block; and
   encoding/decoding the digital media data to/from a compressed bitstream,
   wherein the lapped transform is a lapped biorthogonal transform comprising an overlap filter and a block transform, and wherein said applying the lapped transform comprises performing at least some operations of both the overlap filter and block transform on a single instruction, multiple data basis on the vectors.

16. The at least one computer-readable storage device of claim 15 wherein said applying the lapped transform comprises performing at least some rotation operations of both the overlap filter and block transform on a sequential basis.

17. A method of decoding digital media, the method comprising:
   using a computing device that implements a decoder,
      decoding transform coefficients from a compressed bitstream;
      ordering the decoded transform coefficients into an arrangement of vectors on which operations of an inverse of a lapped transform can be applied across the transform coefficients on a single instruction, multiple data basis;
      applying the inverse of the lapped transform to blocks of the decoded transform coefficients to reconstruct a representation of the digital media data, wherein applying the inverse of the lapped transform comprises performing at least one operation on a single instruction, multiple data basis on the vectors of the transform coefficients; and
      re-mapping components of the vectors to an initial arrangement of the digital media data,
   wherein the inverse of the lapped transform is an inverse of a lapped biorthogonal transform comprising an inverse overlap filter and an inverse block transform, the inverse block transform being applied to blocks of the digital media data and the inverse overlap filter being applied to overlap areas overlapping adjoining blocks, and
   wherein said applying the inverse of the lapped transform comprises applying at least one operation of the inverse overlap filter and at least one operation of the inverse block transform on a single instruction, multiple data basis on the vectors.

18. The method of claim 17, wherein the at least one operation of the inverse overlap filter and the at least one operation of the inverse block transform each comprise a 2×2 Hadamard transform.

19. The method of claim 17, wherein the inverse overlap filter and the inverse block transform each comprise a rotation operation applied to the components on a sequential instruction basis.

20. The method of claim 17, wherein the vectors are 4-component vectors.

21. A method of decoding digital media, the method comprising:
    using a computing device that implements a decoder,
        decoding transform coefficients from a compressed bitstream;
        ordering the decoded transform coefficients into an arrangement of vectors on which operations of an inverse of a lapped transform can be applied across the transform coefficients on a single instruction, multiple data basis;
        applying the inverse of the lapped transform to blocks of the decoded transform coefficients to reconstruct a representation of the digital media data, wherein applying the inverse of the lapped transform comprises performing at least one operation on a single instruction, multiple data basis on the vectors of the transform coefficients; and
        re-mapping components of the vectors to an initial arrangement of the digital media data,
    wherein the inverse of the lapped transform is an inverse of a one-dimensional lapped transform comprising an inverse overlap filter and inverse block transform, the inverse block transform being applied to blocks of the input digital media data and the inverse overlap filter being applied to overlap areas overlapping adjoining blocks, and
    wherein said applying the inverse of the lapped transform comprises applying at least one operation of the inverse overlap filter and at least one operation of the inverse block transform on a single instruction, multiple data basis on the vectors.

22. The method of claim 21, wherein the at least one operation of the inverse overlap filter and the at least one operation of the inverse block transform each comprise a butterfly stage.

23. The method of claim 21, wherein the inverse overlap filter and the inverse block transform each comprise a rotation operation applied to the components on a sequential instruction basis.

24. The method of claim 21, wherein the vectors are 2-component vectors.

\* \* \* \* \*